United States Patent [19]

Kuxdorf et al.

[11] Patent Number: 4,525,329

[45] Date of Patent: Jun. 25, 1985

[54] PROCESS AND APPARATUS FOR MAKING PHOSPHORUS PENTOXIDE WITH UTILIZATION OF REACTION HEAT

[75] Inventors: Bernhard Kuxdorf, Brühl; Peter Luhr, Bad Münstereifel; Hugo Werner, Hürth; Ursus Thümmler, Erftstadt; Friedrich-Wilhelm Dorn, Hürth, all of Fed. Rep. of Germany

[73] Assignee: Hoechst Aktiengesellschaft, Fed. Rep. of Germany

[21] Appl. No.: 601,027

[22] Filed: Apr. 16, 1984

[30] Foreign Application Priority Data

Apr. 29, 1983 [DE] Fed. Rep. of Germany ....... 3315630

[51] Int. Cl.$^3$ ............................................. C01B 25/12
[52] U.S. Cl. ..................................... 422/202; 423/304
[58] Field of Search ................. 423/304; 422/202, 232

[56] References Cited

U.S. PATENT DOCUMENTS

| | | | |
|---|---|---|---|
| 2,356,700 | 8/1944 | Rupp et al. | 422/202 |
| 2,532,322 | 12/1950 | McFarlin | 422/202 |
| 2,644,744 | 7/1953 | Hartwig et al. | 422/202 |
| 3,810,740 | 5/1974 | Berg et al. | 422/202 |
| 4,105,703 | 8/1978 | Motta | 422/202 |
| 4,219,533 | 8/1980 | Hartlapp et al. | 422/200 |
| 4,252,770 | 2/1981 | Thümmler et al. | 422/202 |
| 4,379,131 | 4/1983 | Daniel et al. | 423/304 |
| 4,450,146 | 5/1984 | Klepeis | 423/304 |

Primary Examiner—John Doll
Assistant Examiner—Wayne A. Langel
Attorney, Agent, or Firm—Connolly and Hutz

[57] ABSTRACT

The disclosure relates to a process for making phosphorus pentoxide by subjecting elemental yellow phosphorus to combustion with dried air inside a steel-made combustion chamber with utilization of the reaction heat for the production of energy. To this end, the disclosure provides for the combustion to be effected inside a combustion chamber of which the walls are arranged so as to form a cooling system with cavities therein; for a liquid or liquid/steam-mixture as a heat carrier abstracting the reaction heat to be circulated through the cooling system, the liquid or liquid/steam-mixture assuming an increased temperature being preferably so circulated under increased pressure; for steam formed in the cooling system to be continuously taken therefrom; for an equivalent proportion of fresh liquid to be introduced into the cooling system; for hot $P_2O_5$ issuing in vapor form from the combustion chamber to be condensed or worked up into desirable final product, the combustion chamber being a cylindrical vessel with a height/diameter-ratio of 2.5:1 to 5:1 and having 1 to 10 burners disposed axisymmetrically in its circular base plate.

The disclosure also relates to an apparatus for carrying out the process.

21 Claims, 3 Drawing Figures

PROCESS AND APPARATUS FOR MAKING PHOSPHORUS PENTOXIDE WITH UTILIZATION OF REACTION HEAT

U.S. Pat. No. 4,379,131 describes a process for making phosphorus pentoxide by subjecting elemental yellow phosphorus to a combustion reaction with the aid of air while utilizing the reaction heat for the production of energy, wherein the phosphorus is subjected to combustion with dried air containing, per m$^3$, 5 to 0.01 g water inside a combustion chamber of which the metallic walls are arranged so as to form a cooling system with cavities therein; a liquid or liquid/steam-mixture as a heat carrier for the reaction heat is circulated through the cooling system under a pressure of 1 to 150 bars, the liquid or liquid/steam mixture assuming a temperature of more than 150° up to 500° C.; steam which is being formed in the cooling system is continuously taken therefrom and replaced by an equivalent proportion of fresh liquid; and hot $P_2O_5$ issuing in vapor form from the combustion chamber is condensed or worked up into desirable final product. Water is the liquid which is preferably circulated. The walls forming the cooling system of the combustion chamber are made of stainless steel, for example, and are especially comprised of a plurality of metallic tubular structures directly welded together, of finned tubes or membrane tubes, the individual tubes being disposed vertically or horizontally. Phosphorus pentoxide issues in vapor form from the combustion chamber at a temperature of 300° to 1000° C. and is worked up into phosphoric acid, for example.

Canadian Pat. No. 1 139 099 discloses a process for recovering heat originating from the combustion of elemental phosphorus in the presence of water, and for making ultraphosphoric acid. More specifically, a product stream containing $P_2O_5$ is contacted with a metal cooling coil containing a heat transfer fluid maintaining the surface of the cooling coil at a temperature of 100° to 900° C.

As disclosed in U.S. Pat. No. 4,379,131, the combustion can be effected with the use of dried air to avoid corrosion. In this case, it is naturally possible for the apparatus to be made of standard steel grades. Despite this, it is good practice to use stainless steel to provide, at temperatures of less than 80° C., for the admission even of moist air, this being desirable during the start of operation (heating up period) in, and shutdown of, the apparatus, and also in the event of a potential inrush of water.

Speaking generally, the processes described heretofore actually work but they entail considerable difficulties when tried on a technical commercial scale. For example, in the event of the product gas containing $P_2O_5$ assuming a minimum temperature of less than 358° C., a layer of viscous material commences depositing on the cooling walls whereby further heat transfer becomes naturally adversely affected. The layers are especially thick on deflecting means and in dead corners and they commence detaching in lumpy form from time to time. As a result, the places where lumpy material detaches from are subject to irregular heat load and the individual tube walls are subjected to consequential high inner temperature stress which in turn results in structural changes and ultimately in the formation of cracks. Needless to say heat transfer is also adversely affected at those places finally impinged upon by detached lumpy material.

The free cross-sectional areas of passageways are finally so reduced in diameter that they give rise to the formation of overpressure not allowable in the combustion chamber, which makes it invariably necessary for the apparatus to be immediately shutdown and carefully cleaned.

The use of an apparatus with passageways having a rectangular cross-sectional area is also not fully satisfactory inasmuch as the corners are liable to become thickly covered with depositing material which beyond a certain thickness commences detaching therefrom, naturally with the adverse effects described hereinabove.

In the event of the combustion chamber being made of stainless steel, which is thermally less conductive than standard steel, the maximum allowable inner temperature stress is produced at considerably lower load.

We have now unexpectedly found that the adverse effects referred to hereinabove are not likely to occur in a combustion chamber comprised of a cylindrical structure having one or more burners disposed axisymmetrically in its circular base plate. The temperature prevailing at the surface of each of the individual wall-forming cooling tubes should always be higher than the sublimation temperature (358° C.) of $P_2O_5$, or be just insignificantly lower than that temperature. In this case, the heat transmitting surfaces remain free or become just slightly but regularly layered. In this way, it is possible to achieve very high heating surface loads. As a result of the fact that these surfaces are not or just slightly and more importantly regularly layered, it is possible for the resulting thermal stresses to be distributed regularly around the periphery of the combustion chamber. The annular arrangement of the wall-forming cooling tubes makes it additionally possible for the combustion chamber to be operated under reduced or elevated pressure.

The present invention relates more particularly to a process for making phosphorus pentoxide by subjecting elemental yellow phosphorus to combustion with dried air inside a steel-made combustion chamber with utilization of the reaction heat for the production of energy, which comprises: effecting the combustion inside a combustion chamber of which the walls are arranged so as to form a cooling system with cavities therein; circulating a liquid or liquid/steam-mixture as a heat carrier abstracting the reaction heat through the cooling system, the liquid or liquid/steam-mixture assuming an increased temperature being preferably so circulated under increased pressure; continuously taking from the cooling system steam which is being formed therein; introducing an equivalent proportion of fresh liquid into the cooling system; condensing or working up into desirable final product hot $P_2O_5$ issuing in vapor form from the combustion chamber, the combustion chamber being a cylindrical vessel with a height/diameter-ratio of 2.5:1 to 5:1 and having 1 to 10 burners disposed axisymmetrically in its circular base plate.

Further preferred and optional features of the invention provide:

(a) for one burner to be disposed centrally in the base plate;
(b) for 2 to 10 burners to be disposed equidistantly from each other around (a) cercle(s) concentric to the center of the base plate;
(c) for the air to be used in a stoichiometric excess of 1 to 40%;

(d) for the combustion to be effected under a pressure of 0.8 to 10 bars;

(e) for the burner(s) to be each provided with a single medium nozzle through which liquid phosphorus is admitted to the combustion chamber under a pressure of 5 to 50 bars;

(f) for the burner(s) to be each provided with a two medium nozzle for admitting liquid phosphorus and atomizing air, the atomizing air being admitted to the combustion chamber under a pressure of 2 to 6 bars;

(g) for the combustion chamber to be operated under a heating surface load of 50 to 150 kw/m$^2$;

(h) for the combustion chamber to be operated under a heating volume load of 300 to 600 kw/m$^3$;

(i) for the liquid or liquid/steam-mixture as the heat carrier abstracting the reaction heat to be circulated through the cooling system while being heated to a temperature of 100° to 600° C. under a pressure of 1 to 300 bars;

(j) for the liquid used as the heat carrier and for the production of steam to be water containing 0.01 to 0.1 mg/l oxygen and 0.01 to 0.5 mg/l chloride.

The invention also relates to an apparatus for carrying out the present process comprising a combustion chamber having its walls arranged so as to form a cooling system with cavities therein; a first inlet for admitting liquid phosphorus; a second inlet for admitting air; a phosphorus pentoxide outlet near the upper end of the combustion chamber; a cooling medium cycle flow-connecting the cooling system by means of a plurality of feed and delivery pipes to a steam separating means provided with an inlet for admitting fresh cooling liquid and with a steam outlet; the combustion chamber being a cylindrical vessel presenting a height/diameter-ratio of 2.5:1 to 5:1 and having 1 to 10 burners disposed axisymmetrically in its circular base plate.

Further preferred and optional features of the present apparatus provide:

(a) for one burner to be disposed centrally in the base plate;

(b) for 2 to 10 burners to be disposed equidistantly from each other around (a) cercle(s) concentric to the center of the base plate;

(c) for the walls of the combustion chamber arranged to form the cooling system to be comprised of a plurality of metallic tubular structures which are welded together, of finned tubes or membrane tubes;

(d) for the walls of the combustion chamber to be arranged in upright position and for them to be welded together;

(e) for the combustion chamber to be made of stainless steel.

By operating the combustion chamber under pressure, it is possible to improve the combustion of phosphorus to give very pure P$_2$O$_5$ and to carry out the process without the need to use an additional blower for the product stream containing P$_2$O$_5$. The product stream coming from the combustion chamber can be worked up in conventional manner into phosphoric acid, for example.

The quality of the cooling water which should be used has been defined in "Technischen Richtlinien Dampfkessel" (Technical Guidelines Steam Boilers) set up by the Deutschen Dampfkessel-Ausschuss (German Steam Boiler Commitee) and published by the Vereinigung der Technischen Überwachungsvereine (Union of the Technical Control Services) in Beuth-Verlag. In order to improve the service life of the steel or stainless steel used at high surface loads and wall temperatures, it is additionally necessary in accordance with this invention to provide for the use of cooling water of especially low oxygen and chloride contents.

The functioning of the present process and apparatus used for carrying it out will now be described with reference to the exemplary diagrammatic representations of the accompanying drawing.

With reference to FIG. 1 showing the present apparatus in longitudinal section.

Cylindrical combustion chamber 1 is encapsulated by wall 2 comprised of vertically disposed parallel tubular structures which are welded together, the tubular structures open at their upper and lower ends being grouped in cylindrical collecting tubes 3 and 4, respectively. The combustion chamber 1 is gastightly closed at its lower end by means of a base plate 15 and at its upper end by means of a covering plate 16. Disposed centrally in base plate 15 of combustion chamber 1 is a burner 5 provided, e.g. with a two medium nozzle, liquid elemental phosphorus being admitted to the burner through a first feed line 6 and dried air being admitted through a second feed line 7. Water coming from conduit 8 is introduced at two different places into lower collecting tube 4; it flows through tubular structures 2 into upper collecting tube 3 which it leaves, partially in the form of steam, at two different places via outlets (9, 10) opening into a steam separator 11. Hot steam under pressure is transported through line 12 to a processing station (not shown), whilst water is again introduced through conduit 8 into lower collecting tube 4. A quantity of fresh water corresponding to the quantity of steam removed through line 12 is introduced into steam separator 11 through line 13 provided with a feed pump 7. Product gas containing P$_2$O$_5$ is taken from combustion chamber 1 through pipe 14, and worked up.

With reference to FIG. 2 which is a cross-sectional view of combustion chamber 1.

Figure 1:
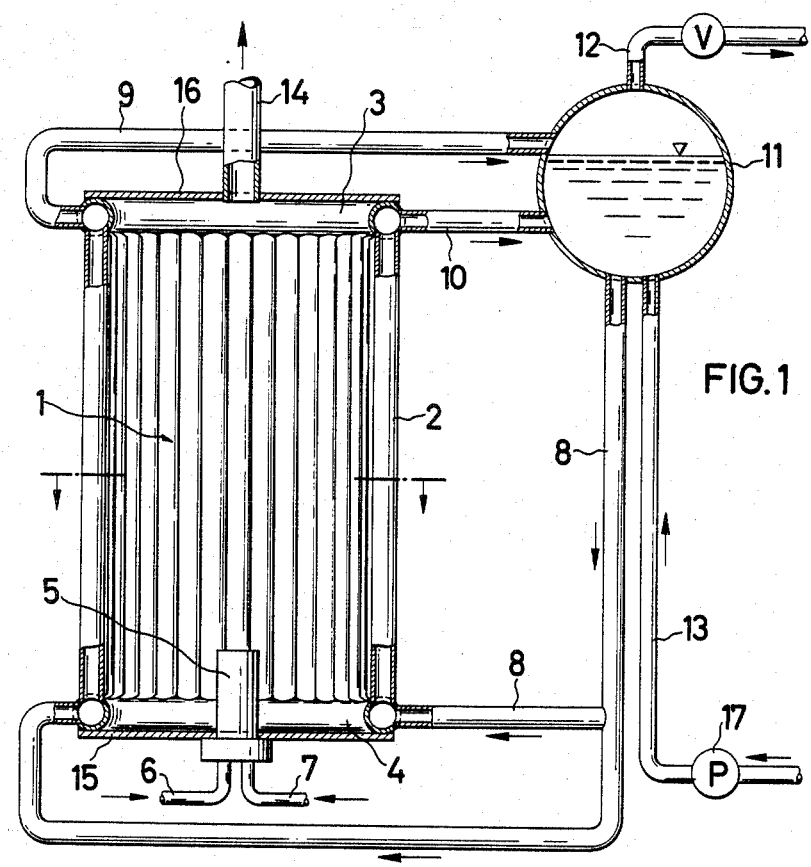
Figures 2, 3:
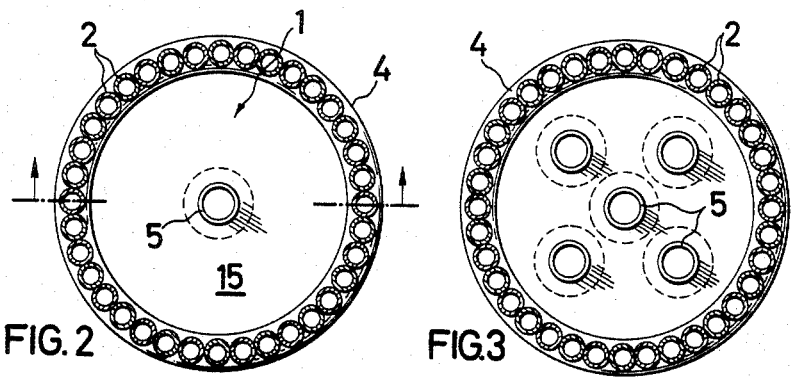
FIG. 2 shows burner 5 centrally disposed in the base plate and wall 2 being comprised of vertically disposed parallel tubular structures which are welded together.
FIG. 3 represents the same cross-sectional view as FIG. 2 save that a further four burners 5 are disposed in the base plate of combustion chamber 1, equidistantly from each other and concentrically to the central burner. In other words, altogether five burners are disposed axisymmetrically in the circular base plate.

EXAMPLE 210 kg per hour elemental yellow liquid phosphorus which had a temperature of 75° C. was subjected to combustion in the presence of dried air under a pressure of 5 bars inside cylindrical combustion chamber 1 with tube walls 2 of stainless steel. The height/diameter-ratio was 4:1.

Just one burner 5 was disposed centrally in the base plate of combustion chamber 1. The burner 5 was provided with a two medium nozzle for phosphorus (coming through feed line 6) and compressed air (coming through feed line 7). Air was used in a stoichiometric excess of 20%. A pressure of 1.5 bars prevailed in combustion chamber 1. 65% of the reaction heat of 4 gj/h set free during the combustion was transmitted through the tube walls to the heat carrying liquid which was fully desalted and degassed water (chloride content: 0.05 mg/l; oxygen content: 0.04 mg/l). As a result, water was partially evaporated. The heating surface load (which diminished from below to above) in the combustion chamber was 120 to 60 kw/m$^2$ for a mean heating volume load of 400 kw/m$^3$.

The water steam-mixture ascended through the individual tubular structures 2 initially into collecting tube 3 and then into steam separator 11 in which steam and liquid were separated from one another. The steam pressure prevailing in the separator was maintained at 80 bars by means of a pressure valve installed in line 12, and saturated steam was removed at a rate of 1.4 tons per hour through line 12. The liquid phase in separator 11 (295° C.) was introduced into the ascending tubular structures forming tube wall 2 through recycle conduit 8 and lower collecting tube 4. The liquid matter cycle effected by density difference in the system was thus closed.

By means of a level control provided in separator 11, it was ensured that the cooling system was always supplied with sufficient water, fresh water being admitted through line 13. Burner 5 in combustion chamber 1 was directed upwardly so that heat of radiation was transmitted to the chamber portion chlose to the burner. P$_2$O$_5$-containing gas issued from combustion chamber 1 through line 14. The phosphorus conversion was quantitative.

We claim:

1. An apparatus for making phosphorus pentoxide by subjecting elemental phosphorus to combustion with dried air with utilization of the reaction heat for the production of energy, comprising: a cylindrical combustion chamber made of stainless steel, arranged in upright position and presenting a height/diameter-ratio of 2.5:1 to 5:1; said combustion chamber being gastightly closed at its upper end by means of a circular covering plate and at its lower end by means of a circular base plate, and having its walls arranged so as to form a cooling system with cavities therein; said cavities being connected to a circular upper collecting tube and to a circular lower collecting tube, respectively, arranged in horizontal position; a steam separating means being connected by a conduit system to said upper collecting tube and to said lower collecting tube, respectively; said steam separating means being provided with an upper hot steam outlet and being penetrated by a lower fresh water feed pipe; said covering plate being provided with a phosphorus pentoxide outlet; and said base plate being penetrated by one burner centrally disposed in said base plate, said burner being provided with a phosphorus feed line and a dried air feed line, respectively.

2. The apparatus as claimed in claim 1, wherein the walls of the combustion chamber arranged to form the cooling system are comprised of a plurality of metallic tubular structures welded together.

3. The apparatus as claimed in claim 1, wherein the walls of the combustion chamber are comprised of finned tubes.

4. The apparatus as claimed in claim 1, wherein the walls of the combustion chamber are comprised of membrane tubes.

5. The apparatus as claimed in claim 1, wherein the combustion chamber is made of steel complying with DIN-specification 17 440 (DIN stands for German Industrial Standard).

6. The apparatus as claim in claim 1, wherein the fresh water feed pipe is provided with a feed pump.

7. The apparatus as claimed in claim 1, wherein the burner is provided with a single medium nozzle admitting liquid phosphorus to the combustion chamber.

8. The apparatus as claimed in claim 1, wherein the burner is provided with a multiple medium nozzle admitting liquid phosphorus and dried atomizing air to the combustion chamber.

9. The apparatus as claimed in claim 1, wherein the combustion chamber is operated under a heating surface load of 50 to 150 kw/m$^2$.

10. The apparatus as claimed in claim 1, wherein the combustion chamber is operated under a heating volume load of 300 to 600 kw/m$^3$.

11. An apparatus for making phosphorus pentoxide by subjecting elemental phosphorus to combustion with dried air with utilization of the reaction heat for the production of energy, comprising: a cylindrical combustion chamber made of stainless steel, arranged in upright position and presenting a height/diameter-ratio of 2.5:1 to 5:1; said combustion chamber being gastightly closed at its upper end by means of a circular covering plate and at its lower end by means of a circular base plate, and having its walls arranged so as to form a cooling system with cavities therein; said cavities being connected to a circular upper collecting tube and to a circular lower collecting tube, respectively, arranged in horizontal position; a steam separating means being connected by a conduit system to said upper collecting tube and to said lower collecting tube, respectively; said steam separating means being provided with an upper hot steam outlet and being penetrated by a lower fresh water feed pipe; said covering plate being provided with a phosphorus pentoxide outlet; and said base plate being penetrated by 2 to 10 burners disposed axisymmetrically in said base plate, said burners being provided with a phosphorus feed line and a dried air feed line, respectively.

12. The apparatus as claimed in claim 11, wherein the fresh water feed pipe is provided with a feed pump.

13. The apparatus as claim in claim 11, wherein the burners are disposed equidistantly from each other around at least one circle concentric to the center of said base plate.

14. The apparatus as claimed in claim 11, wherein each burner is provided with a single medium nozzle admitting liquid phosphorus to the combustion chamber.

15. The apparatus as claimed in claim 11, wherein each burner is provided with a multiple medium nozzle admitting liquid phosphorus and dried atomizing air to the combustion chamber.

16. The apparatus as claimed in claim 11, wherein the combustion chamber is operated under a heating surface load of 50 to 150 kg/m$^2$.

17. The apparatus as claimed in claim 11, wherein the combustion chamber is operated under a heating volume load of 300 to 600 kw/m$^3$.

18. The apparatus as claimed in claim 11, wherein the walls of the combustion chamber arranged to form the cooling system are comprised of a plurality of metallic tubular structures welded together.

19. The apparatus as claimed in claim 11, wherein the walls of the combustion chamber are comprised of finned tubes.

20. The apparatus as claimed in claim 11, wherein the walls of the combustion chamber are comprised of membrane tubes.

21. The apparatus as claimed in claim 11, wherein the combustion chamber is made of steel complying with DIN-specification 17 440.

* * * * *